United States Patent [19]

Carlson

[11] Patent Number: 5,081,213
[45] Date of Patent: Jan. 14, 1992

[54] HETEROCYCLIC THIONE FUNCTIONAL POLYURETHANE POLYMERS AND THEIR USE IN MAGNETIC RECORDING MEDIA

[75] Inventor: James G. Carlson, Maplewood, Minn.

[73] Assignee: Minnesota Mining and Manufacturing Company, St. Paul, Minn.

[21] Appl. No.: 635,858

[22] Filed: Dec. 28, 1990

[51] Int. Cl.$^5$ ............................................. C08G 18/60
[52] U.S. Cl. ...................................... 528/73; 525/452; 524/431; 428/694
[58] Field of Search .................... 528/73; 525/452

[56] References Cited

U.S. PATENT DOCUMENTS

| | | | |
|---|---|---|---|
| 4,201,852 | 5/1980 | Dieterich | 528/73 |
| 4,624,995 | 11/1986 | Katritzky et al. | 528/73 |
| 4,996,281 | 2/1991 | So | 528/73 |

*Primary Examiner*—Paul R. Michl
*Assistant Examiner*—Yong S. Lee
*Attorney, Agent, or Firm*—Gary L. Griswold; Walter N. Kirn; Janice L. Dowdall

[57] ABSTRACT

The invention relates to heterocyclic functional polyurethane polymers and their use in magnetic recording media. The polymer is selected from the group consisting of polyurethane and polyurethane urea wherein the polymer has a heterocyclic group equivalent weight of from about 500 to about 100,000 and wherein the heterocyclic group is derived from compounds selected from the group consisting of

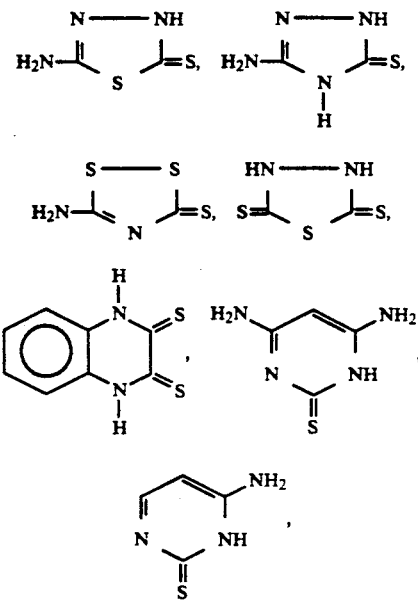

tautomers thereof, and mixtures thereof, wherein the heterocyclic group is formed by reacting said heterocyclic compound into said polymer.

22 Claims, No Drawings

HETEROCYCLIC THIONE FUNCTIONAL POLYURETHANE POLYMERS AND THEIR USE IN MAGNETIC RECORDING MEDIA

FIELD OF THE INVENTION

This invention relates to heterocyclic thione functional polyurethane polymers. The invention also relates to the use of such polymers in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Dispersants tend to soften binder systems and decrease their toughness. They may cure poorly. In addition, dispersants are hydrophilic and tend to increase binder water absorbance. Additionally, binder dispersions can be more readily and reproducibly prepared when no dispersant is used. Further, excess dispersant may have a tendency to bloom from a cured binder dispersion over time, leading to contamination of a recording head or the like, or causing a change in the physical or chemical characteristics of the media.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant or in some instances no dispersant is needed for dispersion of magnetizable pigment in the binder.

A large amount of attention has been focused by persons skilled in the magnetic media art on polyurethanes and other polymers containing sulfonate, carboxylate, phosphate, and ammonium functionality in order to produce pigment dispersing polymers. For example, U.S. Pat. No. 4,152,485 discloses sulfonated polyurethanes. Some of the polymers described in the art can disperse iron oxide and other pigments. The dispersing groups are without exception highly polar, i.e., either salts or strongly acidic or basic.

Polymers containing highly polar dispersing groups can be disadvantageous when high humidity conditions are encountered since it has been demonstrated that the binder hydrolysis rate increases and it is speculated that coatings formed therefrom can soften and swell and friction can increase under high humidity conditions.

Simple non-heterocyclicmercaptan functional polyurethane magnetic binders are known in the art. (Chemical Abstract 111:176356v European Pat. 311935 [1987]; Japanese Pat. 01319122[1988]; Japanese Pat. 1282726[1988].) Such polymers are not capable of dispersing pigment.

Certain heterocyclic thione compounds such as 5-amino-1,3,4-thiadiazole-2-thione (ATDT) have been used for adhesion promotion (Chemical Abstracts 103:224434c, Japanese Pat. 60138540, July 23, 1985) and corrosion prevention in metal coatings on surfaces (Chemical Abstracts 111:223544S, Japanese Pat. 01,116,088, May 9, 1989; Chemical Abstracts 111:223545t, Japanese Pat. 01,126,255, May 18,1989 )

Certain heterocyclic sulfur-containing compounds of less than 40 carbon atoms have been reported as additives to magnetic media dispersions (Chemical Abstracts 113:6758t of Japanese Pat. 01269228, 1989 and Chemical Abstracts 106:86353 of Japanese Pat. 61223070, 1989). They have the general structures, respectively:

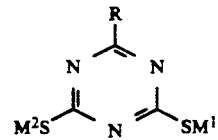

$R=OR^1$, $SR^1$, $NHR^1$, $NR^1R^2$; $R^{1,2}=C_{1\text{-}18}$ alkyl, alkenyl, aryl, aralky , cycloalkyl, alkanol; $M^{1,2}=H$, $NH_4$, alkali metal and

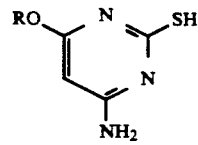

wherein $R=H$, $C_{1\text{-}10}$ alkyl. Certain of these nonpolymeric materials contain the type of side chains which undesirably soften magnetic coatings of which they are a part.

There has been no report of the incorporation of ATDT nor any other heterocyclic thione compounds into urethane polymers.

A need exists for a polymer which can be used in the magnetic recording media field which is hydrophobic and thus capable of withstanding high humidity conditions without experiencing undesirable water absorption in addition to having good pigment dispersing ability, curability, and good mechanical properties (i.e., toughness, abrasion resistance, etc.). We have found such a polymer.

BRIEF DESCRIPTION OF THE INVENTION

One aspect of the invention relates to a novel polymer selected from the group consisting of polyurethane and polyurethane urea, the polymer having at least one type of pendant, chemically bonded, heterocyclic thione group. The heterocyclic group(s) is present in a quantity such that there are between 500 to 100,000 grams of polymer per mole of heterocyclic group. The heterocyclic group is derived from a heterocyclic compound selected from the group consisting of:

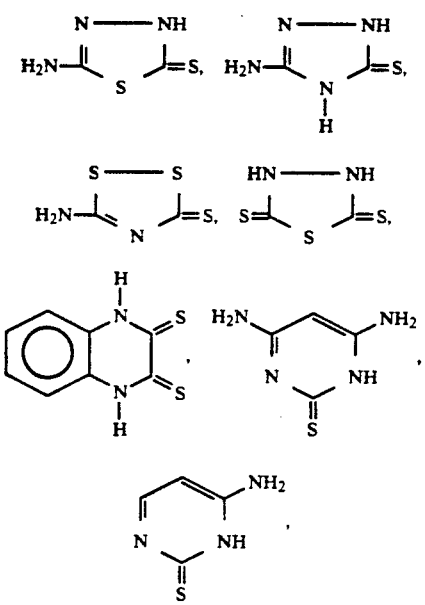

tautomers thereof, and mixtures thereof wherein the heterocyclic group is formed by reacting the heterocyclic compound into the polymer.

One or more cross-linkable hydroxy groups may optionally be pendant from the polymer of the invention, preferably two or more for magnetic binder applications. The polymer of the present invention preferably has a hydroxy group equivalent weight ranging from about 500 to about 10,000, most preferably preferably from about 1000 to 5000 (g/eq).

The polymer of the present invention, particularly the hydroxy functional polymer, is useful as a binder composition characterized by a low dispersion viscosity for use in magnetic recording media and the like that includes an internal dispersion moiety and cross-linking functionality. The polymer has the advantage of providing excellent dispersion of magnetic pigment in addition to providing for magnetic recording media having relatively high magnetic orientation without need for added dispersants even under conditions of relatively high pigment loading. It does this without using any of the highly polar dispersing moieties known in the art.

In another aspect, the present invention provides a dispersion for use in magnetic recording media. The dispersion comprises the binder composition described above. A magnetizable pigment is dispersed in the composition.

In another aspect, the present invention provides a composite for magnetic recording. The composite includes a substrate having a front side and a back side. A cured dispersion comprising a binder composition comprising the above described polymer is coated on at least one side of the substrate. A magnetizable pigment is dispersed in the cured dispersion.

The term "tautomerism" refers to a well-known type of isomerism in which migration of a hydrogen atom results in two or more structures called tautomers. The tautomers are in equilibrium. The ability of the heterocyclic thiones of the invention to tautomerize is discussed in *Heterocycles*, Vol II, p 121, 1978, incorporated by reference herein.

DETAILED DESCRIPTION OF THE INVENTION

I. Methods of Preparing Polymer

The general method of preparing the polymer of the present invention comprises the reaction of polyisocyanate(s) with one or more polyols, including diol(s), optional triol(s), optional tetrol(s), and heterocyclic thione compound(s). The polymer may be prepared in the presence or absence of a solvent. It is preferred to conduct the polymerization in the presence of an organic solvent such as those selected from the group consisting of methylethyl ketone, tetrahydrofuran, xanone, toluene, and mixtures thereof. Most cyclohe preferred solvents include those selected from the group consisting of methylethyl ketone, tetrahydrofuran, and mixtures thereof.

A catalyst may be added to promote the reaction; for example a tin catalyst such as dibutyltin dilaurate. The component polyol(s) and polyisocyanate(s) may be reacted simultaneously or stepwise. The particular method selected may affect the dispersion quality of a dispersion prepared from the polymer of the invention.

There are several different methods of preparing heterocyclic thione functional polyurethane polymers of the invention. A "one step" method involves combining the diol(s) and any optional triol(s), tetrol(s), etc., the heterocyclic thione compound such as ATDT, and any optional catalyst together in order to form a homogeneous mixture and subsequently adding a polyisocyanate such as a diisocyanate to the mixture. The ratio of moles of isocyanate functionality to the moles of hydroxyl plus amino functionality should be less than about 1:1 if hydroxyl functionality is desired in the finished polymer and greater than about 1:1 if isocyanate functionality is desired in the finished polymer This ratio must additionally be adjusted if triol(s) and/or tetrol(s) are present (typically by varying the amount of isocyanate) such that gellation is avoided and such that a soluble product is obtained when a hydroxy functional polymer is desired and optional triol is present. The exact range of suitable ratios is typically in the range of about 0.5:1 to less than about 1:1. If tetrols are present and hydroxy functional polymer is desired, the ratio will typically be less than about 0.5:1. If both triols and tetrols are present the ratio used would typically fall between the ratio used when optional triol is present and the ratio used when optional tetrol is present. When an isocyanate functional polymer is desired and optional triol and/or tetrol is present the ratio is typically in the range of about 1.1:1 to about 4:1. By following the one step method a branched polymer can be prepared by including optional triol(s) and/or tetrol(s) etc. A linear heterocyclic group functional polymer can be prepared by following the "one step" method described above but by excluding the triol(s), tetrol(s), etc.

A "two step" method includes a first step of combining the heterocyclic thione compound such as ATDT with the diol(s) and then adding an excess of diisocyanate and optionally a catalyst for step one in order to form a prepolymer. In a second step a triol is added to the prepolymer in order to form the polymer of the invention.

A "three step" method includes a first step of combining short chain and/or long chain diol(s) with an excess of a polyisocyanate in order to form an isocyanate terminated prepolymer. Preferably, there is at least about a 5 mole percent excess of isocyanate functionality in the polyisocyanate relative to hydroxy functionality in the diol(s). The second step involves the addition of a heterocyclic thione compound such as ATDT to the isocyanate terminated prepolymer such that isocyanate remains in excess and a second prepolymer is obtained. In a third step the second prepolymer is combined with a sufficient excess of a triol such that the polymer of the invention is formed. The triol should have little polar functionality other than the hydroxy groups, and the hydroxy groups should be well spaced in the triol. The resultant polymer is soluble in the reaction solvent (not gelled) and contains excess hydroxyl functionality for future curing.

The two step and three step methods are designed to ensure that substantially all of the unreacted hydroxy groups in the polymer that are available for final cure are those hydroxy groups that are pendant from the triol. This can have favorable effects on dispersing and cure. The triol is preferably a hydrophobic segment precursor such as polycaprolactone triol so that unreacted hydroxyl groups are well isolated spatially from the relatively polar urethane groups contained in the polymer backbone.

As one example of the three step method, a diol monomer and diphenylmethane diisocyanate are combined in methyl ethyl ketone solvent in a ratio such that the number of isocyanate groups per hydroxy group is initially about 1.3. After all available hydroxy groups have been reacted, a prepolymer is obtained containing an excess of isocyanate. The prepolymer is subsequently reacted with a heterocyclic compound such as ATDT such that isocyanate remains in excess. The product is then reacted with a hydrophobic triol such that the ratio of isocyanate group to hydroxy group is within the range of about 0.3 to about 0.6. The resultant polymer product has cross-linkable hydroxy groups pendant from hydrophobic polymer chain segments comprising the triol.

I(a). Polyol

The term "polyol" as used herein refers to polyhydric alcohols containing two or more hydroxyl groups and includes diols, triols, tetrols, etc.

I(a)(i). Triols

A preferred class of triols comprises polycaprolactone triols. One particularly useful triol is a polycaprolactone triol having a hydroxy equivalent weight of about 180 and a number average molecular weight of approximately 540, available under the trade dersignation Tone TM 0305 from Union Carbide Company. Other useful triols include polyether triols such as polypropylene oxide triol, polyester triols other than polycaprolactone triols, e.g. butylene adipate triols or polyols, and simple triols such as trimethylolpropane and glycerol. Tetrafunctional or higher alcohols such as pentaerythritol may also be useful. Preferably the hydroxy groups in the triol are primary in order to facilitate curing of the resultant polymer with a curing agent. It is also foreseen that mixtures of various triols may be utilized.

I(a)(ii). Diols

A variety of diols may be utilized according to the invention including both short chain and long chain diols. Also, mixtures of diols can be used. A preferred class of diols are oligomeric diols defined as diols having a hydroxy equivalent weight greater than about 200 (g/eq). Most preferred are the polycaprolactone diols and polycarbonate diols having a hydroxy equivalent weight of from about 200 to 2,000 (g/eq). Such materials include polyester diols such as Tone TM 0210, available from Union Carbide Company, having a hydroxy equivalent weight of about 415. Another such material is Duracarb TM 120, a polycarbonate diol from PPG Industries having a number average molecular weight of about 450 (hexanediol carbonate).

Other useful diols include: polyether diols such as polytetramethylene glycols and polypropylene glycols; and polyester diols, such as a polyester diol that is the reaction product of adipic acid and butane diol. Preferably, at least some low molecular weight (less than about 200 number average molecular weight) diols are used to provide preferred hardness characteristics to the polymer and the magnetic media prepared therefrom. Examples of these are ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; cyclohexane dimethanol; 1,4-cyclohexanedimethanol; ethylene oxide and/or propylene oxide adduct of bisphenol A; ethylene oxide and/or propylene oxide adduct of hydrogenated bisphenol A. Examples of other diols which may be useful include macromonomer diols, diols having polar functional groups, and fluorinated diols such as $C_8F_{17}SO_2N[(CH_2)_2OH]_2$. Fluorinated diols can be used in an amount such that the fluorinated diol comprises about 0.1 to about 20 weight-percent of the polymer of the invention. It is further noted that for any of the reactants mentioned, mixtures of materials can be utilized.

I(c). Polyisocyanates

A wide variety of polyisocyanates may be utilized according to the present invention. Preferably, diisocyanates are utilized. Useful diisocyanates include but are not limited to those selected from the group consisting of diphenylmethane diisocyanate, isophorone diisocyanate, toluene diisocyanate, hexamethylene diisocyanate, tetramethylxylene diisocyanate, and p-phenylene diisocyanate. It is noted that mixtures of diisocyanates can also be used.

I(b). Heterocyclic Thione Groups

At least one heterocyclic thione group is pendant from the polymer of the invention. The term "pendant" as used herein would include a moiety bonded to an interior portion of the polymer as well as to a moiety bonded to a terminal portion of the polymer.

The heterocyclic functional groups pendant from the polymer are referred to herein as heterocyclic "thione" groups since the groups are derived from heterocyclic "thione" compounds. The heterocyclic compounds exist in tautomeric form. The thione tautomer predominates over the thiol tautomer and thus the compounds are referred to as "thiones" in the *Chemical Abstracts 9th Collective Index*, incorporated by reference herein. The polymer of the invention has a heterocyclic thione group equivalent weight ranging from about 500 to about 100,000, preferably from about 5000 to about 100,000 for reasons of solvent solubility, and most preferably from about 10,000 to about 30,000 (g/eq) in order to facilitate preparation of magnetic media dispersions having optimum viscosity ranges. Useful heterocyclic thione compounds from which the pendant heterocyclic thione groups are derived include those selected from the group consisting of

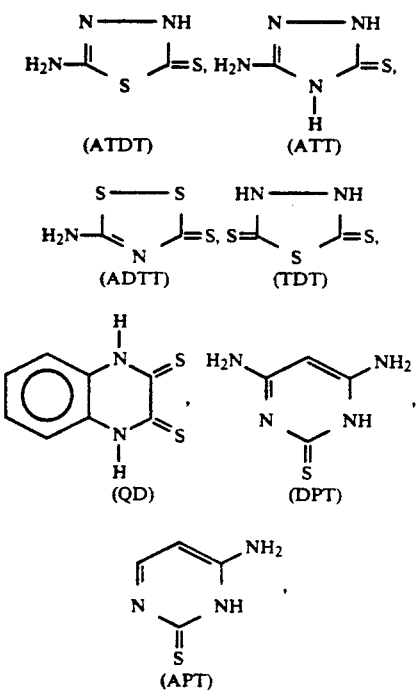

tautomers thereof, and mixtures thereof.

Preferred heterocyclic compounds from which the pendant heterocyclic groups are derived include those selected from the group consisting of

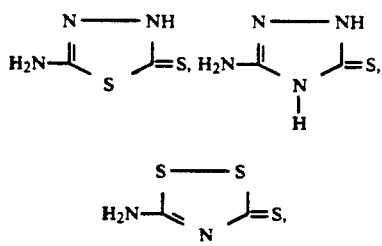

tautomers thereof, and mixtures thereof.

The heterocyclic compounds become covalently bonded to the polymer during the process of copolymerization of isocyanate(s) with polyol(s) and the heterocyclic compound(s) thus resulting in a polymer having at least one pendant heterocyclic group. The heterocyclic compounds react readily with isocyanates though a base catalyst is needed when employing a heterocyclic compound having no primary amino group. In this way the heterocyclic compounds become incorporated or reacted into polyurethane or polyurethane urea structures during the polymerization of the polymer of the invention from isocyanate(s), polyol(s), and heterocyclic compound(s).

Although we do not wish to be bound to any theories we believe that the thioneamide groups of the heterocyclic compound(s) must remain largely unreacted with isocyanate in order for the polymer to be effective in its end uses. If the heterocyclic compound selected contains a primary amino moiety (i.e. ATDT, ATT, ADTT, DPT, APT), no base catalyst is used. We presume that the primary amino group reacts with isocyanate to form a urea linkage and that the thioneamide groups of these compounds remain largely underivatized. If the heterocyclic compound selected contains no primary amino group (i.e. TDT, QD), a base catalyst is preferably added whereupon it is thought that, after one of the thioneamide groups of each heterocyclic compound reacts with isocyanate reactivity of the other group is lowered and thus the other group remains largely unreacted. In this way the thioneamide moieties become covalently bonded to the polymer backbone.

I(c). Hydroxy Groups

For magnetic binder applications, the polymer of the invention preferably possesses hydroxy functionality. It is most preferred but not required that there be on the average more than about 2 hydroxy groups per polymer available for crosslinking purposes. Polymers intended for magnetic binder use preferably have a cross-linkable hydroxy group equivalent weight of from about 500 to about 50,000, most preferably from about 1,000 to about 5,000 (g/eq).

V. Dispersions of Polymer for Use in Magnetic Media

The binder described herein can be used to prepare magnetic media such as tapes, e.g., video tapes, computer tape and data cartridge tape, and diskettes, both single-sided and double-sided.

A magnetic or magnetizable pigment can be readily dispersed within the polymeric binder of the invention, dispersion being facilitated by the incorporated heterocyclic moiety. The preparation of dispersions of magnetic pigments within the polymer of the present invention, is relatively straight-forward. A variety of pigments may be used, including but not limited to: ferric oxides; gamma ferric oxide; cobalt doped gamma ferric oxides; chromium oxide; iron; iron-cobalt; cobalt; nickel; cobalt-nickel; cobalt-phosphorus; barium ferrite; and mixtures thereof.

It is foreseen that a variety of loadings, densities, solvent systems, adjuvants, etc., may be utilized. The following conditions are typical, and were employed in preparation of some of the dispersions reported in the examples below (parts by weight unless otherwise noted): about 100 parts of fine pigment such as (Co-$\gamma$-Fe$_2$O$_3$) having a surface area 50 m$^2$/g and a powder coercivity of 950 Oersted; about 15 to 40 parts of binder (i.e., polymer); and about 150 to 400 parts of solvent are combined with about 750 parts of steel or glass milling media in a steel container and milled by agitation until the pigment is dispersed throughout.

The dispersion of the present invention can be readily cured. One method of cure involves use of multi-functional isocyanate curing agents, the isocyanate groups of which may react with hydroxy groups which may be present on the polymer of the present invention. The primary mode of cure is believed to be a moisture cure reaction between available isocyanate groups and H$_2$O molecules present in the environment. Hydroxy groups present in the polymer of the invention can react with isocyanate groups and thus facilitate cure. A curative is typically added after a dispersion comprising pigment, solvent, and binder is prepared. A typical curative comprises, for example, a triisocyanate such as the adduct of toluene diisocyanate with trimethylol propane. One such material is available under the trade designation Mondur ™ CB-601 from Mobay Chemical Company. Typical curatives are polyisocyanate compounds, for example polyisocyanates such as Mondur ™ CB-601, Mondur ™ CB-75, Mondur ™ MRS (all available from Mobay Chemical Co.), Desmodur L (available from Bayer A.G.), and Coronate L (available from Nippon Polyurethane). Additional isocyanate curing agents are described in U.S. Pat. No. 4,731,292, incorporated by reference herein. The curative is preferably added in a proportion of about 1 to about 20 weight percent based upon the binder weight.

The resulting dispersion can be readily applied to a support such as a polyethylene terephthalate (PET) film using a knife coating method. The support on which the magnetic coating material is applied may be made of the following materials; polyesters such as polyethylene terephtalate and polyethylene-2,6-naphthalate; polyolefins such as polyethylene and polypropylene; derivatives of cellulose such as cellulose triacetate, cellulose acetate butylate, cellulose acetate propionate; polycarbonate; polyvinyl chloride; polyimides; polyamides; metals such as aluminium and copper; and paper. Immediately after coating and while the solvent is still present and the binder is substantially uncured, the coated substrate typically undergoes orientation in a magnetic field to align the magnetic particles. After coating and orienting, the substrate is dried of solvent and allowed to cure. The curing retains the pigment in the oriented manner. Curing can take place either at room temperature or at elevated temperatures (50°-60° C).

A variety of additives known to those skilled in the art can be incorporated into the dispersion of the present invention. The dispersion can further comprise head-cleaning agents, lubricants, dispersants, and wetting agents. It is envisioned that lubricants such as those disclosed in U.S. Pat. Nos. 4,731,292 and 4,784,907, both incorporated by reference herein, could be added to obtain desired frictional and processing characteristics. Examples of useful lubricants include but are not limited to $C_{10}$ to $C_{22}$ fatty acids, $C_1$ to $C_{18}$ alkyl esters of fatty acids, and mixtures thereof. Other examples of useful lubricants include silicone compounds such as silicone oils, fluorochemical lubricants, fluorosilicones, and particulate lubricants such as powders of inorganic or plastic materials. Preferred lubricants include myristic acid, stearic acid, palmitic acid, and butyl and amyl esters thereof. Typically mixtures of lubricants are used, especially mixtures of fatty acids and fatty esters.

If the binder described herein is used as a back-coat for magnetic media, the back-coat can optionally further comprise non-magnetizable pigments, such as, for example, carbon black, graphite, aluminum oxide, titanium dioxide, zinc oxide, silica gel, calcium carbonate, barium sulfate, and mixtures thereof.

The dispersion may further comprise an effective amount of a suitable dispersing agent, preferably about 1 to about 10 weight percent based upon pigment weight in order to disperse the pigment. Suitable dispersants include lethicin and quaternary ammonium acetates or phosphates such as Emcol ™ acetate, a polypropylene oxide adduct of diethyl ethanolamine quarternized with ethylene oxide and acetic anhydride, having a number average molecular weight of about 2300, and Emcol ™ phosphate, a polypropylene adduct of diethyl ethanolamine quarternized with ethylene oxide and phosphoric acid. Both are available from Witco Chemical Co. and are disclosed in U.S. Pat. No. 4,837,082 incorporated by reference herein.

The dispersion may further comprise about 1 to about 10 weight percent of a wetting agent based upon the weight of the pigment. Suitable wetting agents include but are not limited to phosphoric acid esters such as mono-phosphorylated propylene oxide adducts of glycerin, e.g., the reaction product of 1 mole of phosphorous oxychloride with the reaction product of 10-11 moles of propylene oxide and 1 mole of glycerine.

Examples of useful head cleaning agents include but are not limited to those disclosed in U.S. Pat. Nos. 4,784,914 and 4,731,292 both incorporated by reference herein. Examples of such head cleaning agents include but are not limited to alumina, chromium dioxide, alpha iron oxide, and titanium dioxide particles of a size less than about 2 microns which have a Mohs hardness of greater than about 5 and which are added in an amount ranging from about 0.2 to about 20 parts per hundred parts of magnetic pigment.

The detailed description includes exemplary preparations of the polymer in accordance with the invention and dispersions prepared therefrom. All parts and percentages throughout the Specification, including the Examples, are by weight unless otherwise indicated.

In the following examples, the following agents are used

Tone ™ 0210—a polycaprolactone diol produced by Union Carbide, number average molecular weight about 825, hydroxy equivalent weight about 415.

Duracarb ™ 120—an aliphatic polycarbonate diol, number average molecular weight about 900, from PPG Industries, Inc.

Neopentyl glycol—a low molecular weight diol, number average molecular weight 104, hydroxy equivalent weight 52, additive for providing preferred characteristics.

Tone ™ 0305—a polycaprolactone triol available from Union Carbide, number average molecular weight about 540, hydroxy equivalent weight about 180.

Diphenylmethane diisocyanate (MDI)—an isocyanate, number average molecular weight 250, isocyanate equivalent weight 125.

Mondur ™ CB-601—a triisocyanate available from Mobay Chemical Company. CB-601 is a toluene diisocyanate-based adduct of unspecified triols and diols which contains 10.4 percent NCO and is supplied as a 60 percent solution in ethylene glycol diacetate.

MOGUL-L—a carbon black available from Cabot Corporation having an average particle size of 24 nanometers and surface area of 138 square meters/gram.

MEK—methyl ethyl ketone
ATDT—5 amino-1,3,4-thiadiazole-2-thione
ADTT—5-amino-1,2,4-dithiazole-3-thione
ATT—5-amino-1,2-dihydro-1,2,4-triazole-3-thione
APT—4-amino-2-pyrimidinethione
DPT—4,6-diamino-2-pyrimidinethione
TDT—1,3,4-thiadiazolidine-2,5-dithione
QD—1,4-dihydro-2,3-quinoxalinedithione Dowa HM-19 is a 47m²/g iron particle available from DOWA Mining Co., Ltd., Tokyo, Japan.

Showa head cleaning agent is an alumina particle material available from Showa Denka Ltd., Tokyo, Japan.

Definition of Terms

Equivalent Weight

The term "equivalent weight" or "Eq. Wt.", as used herein with respect to a functionality or moiety, refers to the mass of polymer per mole, or equivalent, of functionality.

Squareness Ratio

The squareness ratio (Br/Bm), which is the ratio of the remnant saturation induction, or residual magnetization (Br), to the saturation induction, or saturation magnetization (Bm), refers to the effectiveness of the orientation of the magnetic particles in a dispersion. For randomly-oriented particles, the squareness ratio is 0.5 and for ideally and perfectly oriented particles, the ratio is equal to 1.0, thus the higher the value the better.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

Smoothness

The smoothness of various magnetic media binder dispersions was determined by microscopic examination and refers to the substantial absence of any visible discrete particles. The dispersion uniformity was judged qualitatively.

Gloss

"Gloss" refers to the percentage of light incoming at 45° that is reflected at an observation angle of 45° measured via a Pacific Scientific Glossgard II 45° glossmeter.

EXAMPLE 1

20,000 Eq. Wt. ATDT Polyurethane

To a 5 liter flask were added 464g (1.093 eq) Tone TM 0210 polycaprolactone diol, 97.2 g (1.87 eq) neopentyl glycol, 1646 g MEK, and 0.2 g dibutyltindilaurate. The mixture was heated to distill off 50 g of MEK and then cooled to 50° C. 492 g (3.94 eq) diphenylmethane diisocyanate (MDI) were added and the reaction was heated at reflux for 1 hour. 9.4 g (0.071 eq) 5-amino-1,3,4-thiadiazole-2-thione (ATDT) was then added and the reaction was held at reflux for another hour. 327 g (1.82 eq) Tone TM 0305 polycaprolactone triol and 491g MEK were added and the mixture was heated for 3 hours at reflux. One additional charge of diphenylmethane diisocyanate (10.79, 0.086 eq) was added and reacted for 1 hour to reach a final inherent viscosity of 0.29. The calculated hydroxyl equivalent weight was 1950 g/eq and the calculated ATDT content was 20,000 g/eq.

EXAMPLE 1A 20,000 Eq. Wt. ATDT Polycarbonate Polyurethane

The procedure of Example 1 was followed except for the use of 464 g Duracarb TM 120, 97 g neopentyl glycol, 500 g MDI, 9.3 g ATDT, 323 g Tone TM 305, and 2097 g MEK. Final inherent viscosity =0.29. Calculated hydroxyl equivalent weight =1850 g/eq. Calculated ATDT equivalent weight=20,000.

EXAMPLE 2

10,000 Eq. Wt. ATDT Polyurethane

The procedure of Example 1 was followed except for the use of 60.2 g Tone TM 0210, 12.6 g neopentyl glycol, MDI, 2.5 g ATDT, 43.5 g Tone TM 0305, 348 g MEK, 0.0 g additional MDI. Final inherent viscosity=0.246. Calculated hydroxyl equivalent weight=1937 g/eq. Calculated ATDT equivalent weight=10,000 g/eq.

EXAMPLE 3

30,000 Eq. Wt. ATDT Polyurethane

The procedure of Example 1 was followed except for the use of 60.3 g Tone TM 0210, 12.6 g neopentyl glycol, 63.4 g MDI, 0.8 g ATDT, 42.1g Tone TM 0305, 338 g MEK, 1.3 g additional MDI. Final inherent viscosity=0.295. Calculated hydroxyl equivalent weight=1945 g/eq. Calculated ATDT equivalent weight=30,000 g/eq.

EXAMPLE 4

5,000 Eq. Wt. ATDT Polyurethane

The procedure of Example 1 was followed except the use of 60.2 g Tone TM 0210, 12.6 g neopentyl glycol, 71 g MDI, 5.2 g ATDT, 45.7 g Tone TM 0305, 363 g MEK. Final inherent viscosity=0.22. Calculated hydroxyl equivalent weight=1900 g/eq. Calculated ATDT equivalent weight=5000 g/eq.

EXAMPLE 5

60,000 Eq. Wt. ATDT Polyurethane

The procedure of Example 1 was followed except for the use of 60.2 g Tone TM 0210, 12.6 g neopentyl glycol, 65.8 g MDI, 0.4 g ATDT, 41.8 g Tone TM 0305, 270 g MEK. Final inherent viscosity=0.275. Calculated hydroxyl equivalent weight=1850 g/eq. Calculated ATDT equivalent weight=60,000 g/eq.

EXAMPLE 6

120,000 Eq. Wt. ATDT Polyurethane The procedure of Example 1 was followed except for the use of 60.2 g Tone TM 0210, 12.6 g neopentyl glycol, 64.9 g MDI, 0.2 g ATDT, 4.6 g Tone TM 0305, 269 MEK. Final inherent viscosity=0.28. Calculated hydroxyl equivalent weight=1850 g/eq. Calculated ATDT equivalent weight=120,000 g/eq.

EXAMPLE 7

10,000 Eq. Wt. TDT Polyurethane

The procedure of Example 1 was followed except for the use of 64.8 g Tone TM 0210, 12.6 g neopentyl glycol, 70.7 g MDI, 3.0 g TDT in place of ATDT, 47.0 g Tone TM 0305, 377 g, MEK. Final inherent viscosity=0.29. Calculated hydroxyl equivalent weight=1800 g/eq. Calculated TDT equivalent weight=10,000 g/eq.

EXAMPLE 8

10,000 Eq. Wt. QD Polyurethane

The procedure of Example 1 was followed except for the use of 64.8 g Tone TM 0210, 12.6 g neopentyl glycol, 70.7 g MDI, 3.3 g QD in place of ATDT, 47.0 g Tone TM 0305, 378 g MEK. Final inherent viscosity=0.33. Calculated hydroxyl equivalent weight=1800 g/eq. Calculated QD equivalent weight=10,000 g/eq.

EXAMPLE 9

20,000 Eq. Wt. DPT Polyurethane

The procedure of Example 1 was followed except for the use of 60.2 g Tone TM 0210, 12.6 g neopentyl glycol, 65.4 g MDI, 1.4 g DPT in place of ATDT, 43.5 g Tone TM 0305, 65.4 gg MEK. Final inherent viscosity=0.30. Calculated hydroxyl equivalent weight=1800 g/eq. Calculated DPT equivalent weight=20,000 g/eq.

EXAMPLE 10

20,000 Eq. Wt. APT Polyurethane

The procedure of Example 1 was followed except for the use of 60.2 g Tone TM 0210, 12.6 g neopentyl glycol, 63.9 g MDI, 1.2 g APT in place of ATDT, 42.5 g Tone TM 0305, 274 g MEK. Final inherent viscosity=0.25. Calculated hydroxyl equivalent weight=1800 g/eq. Calculated APT equivalent weight=20,000 g/eq.

EXAMPLE 11

10,000 Eq. Wt. ATT Polyurethane

The procedure of Example 1 was followed except for the use of 60.2 g Tone TM 0210, 12.6 g neopentyl glycol, 65.4 g MDI, 2.2 g ATT in place of ATDT, 43.5 g Tone TM 0305, 347 g MEK. Final inherent viscosity=0.28. Calculated hydroxyl equivalent weight=1800 g/eq. Calculated ATT equivalent weight=10,000 g/eq.

EXAMPLE 12

20,000 Eq. Wt. ADTT Polyurethane

The procedure of Example 1 was followed except for the use of 55.0 g Tone TM 0210, 11.5 g neopentyl glycol, 58.4 g MDI, 1.2 g ADTT, 38.8 g Tone TM 0305, 280 g MEK. Final inherent viscosity=0.26 Calculated hydroxyl equivalent weight=1500 g/eq. Calculated ATDT equivalent weight=20,000 g/eq.

CONTROL EXAMPLE 13

Hydroxy Functional Polyurethane

The procedure of Example 1 was followed except for the use of 60.2 g Tone TM 0210, 12.6 g neopentyl glycol, 62.4 g MDI, 0.0 g ATDT, 41.5 g Tone TM 0305, 333 g MEK, 2.0 g additional MDI. Final inherent viscosity=0.286. Calculated hydroxyl equivalent weight=1948 g/eq.

EXAMPLE 14

One Step ATDT Polyurethane

To a 1 liter flask were added 55 g (0.129 eq) Duracarb 120 polycarbonate diol, 11.5 g (0.222 eq) Neopentyl glycol, 1.1 g (0.008 eq) ATDT, 38.7 g (0.215 eq) Tone 0305 polycaprolactone triol, 0.1 g dibutyltindilaurate, and 297 g MEK. The mixture was stirred and 58.3 g (0.466 eq) diphpenylmethane diisocyanate was added and the reaction was heated at reflux for 3 hours. The final inherent viscosity was 0.22. Calculated hydroxyl equivalent weight=1850 g/eq. Calculated ATDT equivalent weight=20,000 g/eq.

EXAMPLE 15

Two Step ATDT Polyurethane

To a 1 liter flask were added 55 g (0.129 eq) Duracarb TM 120 polycarbonate diol, 11.5 g (0.222 eq) neopentyl glycol, 190 g methylethyl ketone, 0.1 g dibutyltindilaurate and 1.1g (0.008 eq) ATDT. The mixture was stirred and 58.3 g (0.466 eq) diphenylmethane diisocyanate was added and the reaction was heated at reflux for 2 hours. 38.7 g (0.215 eq) Tone TM 0305 polycaprolactone triol, and 58 g methylethylketone were added and the reaction was held at reflux for 4 hours. The final inherent viscosity was 0.26. The calculated hydroxyl equivalent weight was 1850 g/eq and the calculated ATDT content was 20,000 g/eq.

EXAMPLE 16

Linear ATDT Polyurethane

To a 1 liter flask were added 60 g (0.129 eq) Tone TM 0210 polycaprolactone diol, 12.6 g (0.242 eq) neopentyl glycol (Union Carbide), 306 g MEK and 0.1 g dibutyltindilaurate. The mixture was heated to distill off 50 g of MEK. 58.3 g (0.466 eq) diphenylmethane diisocyanate was added and the reaction was heated at reflux for 1 hour. 1.3 g (0.009 eq) ATDT was then added and the reaction was held at reflux for 1 hour. 50.7 g (0.119 eq) Tone 0210 polycaprolactone diol and 94 g MEK were added and the reaction was held at reflux for 2.5 hours. The final inherent viscosity was 0.37. The calculated ATDT content was 20,000 g/eq.

EXAMPLE 17

Preparation of Dispersions

The purpose of Example 17 was to demonstrate the application of the polymers of the invention as binders in magnetic recording media. Eight separate binder dispersion compositions were prepared. The following ingredients were separately introduced into a 0.5 liter stainless steel milling container and mixed and dispersed therein, for 5 hours at 1500 RPMS in order to form a dispersion: 81g of iron oxide pigment ISk 9966 (available from Ishihara Sangyo Kaisha, Ltd., Tokyo), 192 g of methyl ethyl ketone, 600 g of steel media (1.3mm diameter), and 27 g of the polymer of the invention.

The resulting dispersions were applied to films of a polyethylene terephthalate (thickness: 25 micrometers) by means of knife coating and the resulting coated films were allowed to stand in a parallel magnetic field of 1400 Oersted for about one second. The magnetic layers obtained had thicknesses of about 5 micrometers. The dispersions for preparing the tapes of the foregoing examples were evaluated for viscosity. The squareness ratio and gloss of the magnetic coatings of the tapes prepared in the foregoing examples were also measured. Smoothness (examined under a microscope), gloss, and dispersion viscosity, and squareness data is shown in Table I.

TABLE I

Dispersion Quality

| Polymer In Dispersion | Functionality Eq. Wt. Group | Smoothness | Gloss | ICI Dispersion Viscosity | Squareness |
|---|---|---|---|---|---|
| Ex. 4 | 5,000 ATDT | Good | 55 | 25 | 0.65 |
| Ex. 2 | 10,000 ATDT | Good | 72 | 39 | 0.69 |
| Ex. 1 | 20,000 ATDT | Good | 60 | 23 | 0.72 |
| Ex. 3 | 30,000 ATDT | Good | 60 | 45 | 0.72 |
| Control Ex. 13 | No ATDT | Poor | | Did not disperse oxide | |
| Ex. 5 | 60,000 ATDT | Fair | | Dispersed, high viscosity | |
| Ex. 6 | 120,000 ATDT | Poor | | Did not disperse oxide | |
| Ex. 1A | 20,000 ATDT | Good | 57 | 35 | 0.73 |

The data contained in Table I demonstrates that the ATDT containing polymer provides a dispersing effect over a range of equivalent weights. There is an optimum equivalent weight range of about 10,000 to 30,000 seen for the particular pigment used in these Examples in terms of squareness and viscosity. Although the 60,000 equivalent weight ATDT containing polymer had a very high viscosity, such a polymer could be rendered useful as a binder by the addition of dispersant materials.

EXAMPLE 18

Preparation of Dispersions

Dispersions were prepared from the polymers prepared according to Examples 1, 7-12, and Control Example 13 according to the method of Example 17. The properties of the dispersion are set forth in Table II below. In Table II, dispersions comprising the heterocyclic thione functional polymers of the invention are compared with a dispersion comprising a polymer having no heterocyclic thione functionality (Control Example 13), and a dispersion wherein 0.18 g of thione monomer ATDT and 27 g of non-thione containing polyurethane are physically combined (Control Example 13 +ATDT monomer).

TABLE II

| Polymer in Dispersion | Equivalent Weight | ICI Viscosity | Gloss | Squareness | Dispersed Pigment |
|---|---|---|---|---|---|
| Ex. 1 | ATDT = 20,000 | 30 | 72 | 0.750 | yes |
| Ex. 12 | ADTT = 20,000 | 31 | 62 | 0.771 | yes |
| Ex. 11 | ATT = 10,000 | 30 | 53 | 0.694 | yes |
| Ex. 10 | APT = 20,000 | 92 | 12 | 0.611 | yes |
| Ex. 9 | DPT = 20,000 | 40 | 45 | 0.648 | yes |
| Ex. 7 | TDT = 10,000 | 76 | 35 | 0.697 | yes |
| Ex. 8 | QD = 10,000 | 49 | 35 | 0.681 | yes |
| Control Ex. 13 | | | | | no |
| (Control Ex. 13 + ATDT Monomer) | ATDT Monomer = 20,000 | | | | no |

The data contained in Table II demonstrates that all of the heterocyclic thione functional polyurethane polymers of the invention provide good pigment dispersions. The preferred dispersions in Table II are those which comprise ATDT containing polymer, ADTT containing polymer, and ATT containing polymer since they provide a particularly useful combination of low viscosity, good gloss, and good squareness values. The Control Examples demonstrate that it is necessary to have the heterocyclic thione pendant from the polymer chain in order to obtain a dispersion.

EXAMPLE 19

Preparation of Dispersions 10,000 ATDT, 20,000 ATDT, and 30,000 ATDT polymer prepared according to Examples 2, 1, and 3, respectively, were formulated into metal particle dispersions as follows: metal particle Dowa HM-19 (150g); Showa head cleaning agent (12 g); polymer of the invention solids weight (31g); MEK (244 g); cyclohexanone (54 g); toluene (60g); and ceramic milling media (485 g). This mixture was milled at 1500rpm in a 0.51 sand mill for 8 hours and then coated and aligned as in Example 14. The following data was obtained:

TABLE III

| Polymer in Dispersion | ICI Viscosity | Gloss | Squareness |
|---|---|---|---|
| Ex. 2 = 10,000 ATDT | 20 | 47 | 0.707 |
| Ex. 1 = 20,000 ATDT | 30 | 33 | 0.692 |
| Ex. 3 = 30,000 ATDT | 22 | 23 | 0.674 |

The 10 000 and 20 000 ATDT polymer dispersions appeared very smooth at 256× magnification. The 30,000 ATDT polymer dispersion was only slightly rougher at 256× magnification and would have appeared smoother if it had been subjected to further milling. The viscosity values fall within the preferred range for coating and the gloss and squareness values are acceptable for this type of experiment.

EXAMPLE 20

Preparation of Carbon Black Dispersion

The procedure of Example 17 was followed except for the use of 44 g Mogul-L carbon black, 39 g of Example 15 2 step ATDT-polyurethane, 216 g MEK, and 600 g of steel media (1.3mm diameter). The dispersion appeared smooth at 256× magnification. The gloss value obtained was 72.

Other embodiments of this invention will be apparent to those skilled in the art from a consideration of this specification or from the practice of the invention disclosed herein. Various omissions, modifications, and changes to the principles described herein may be made by one skilled in the art without departing from the true scope and spirit of the invention which is indicated by the following claims.

What is claimed is:
1. A polymer comprising:
(a) a polymer selected from the group consisting of polyurethane and polyurethane urea, said polymer having at least one pendant heterocyclic group, wherein said polymer has a heterocyclic group equivalent weight of from about 500 to about 100,000, and wherein said heterocyclic group is derived from a compound selected from the group consisting of

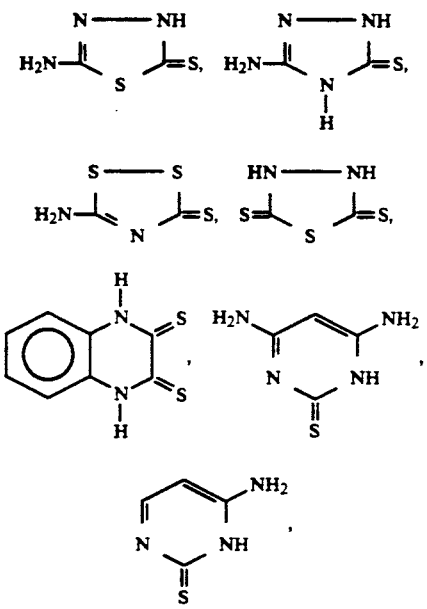

tautomers thereof, and mixtures thereof, wherein said heterocyclic group is formed by reacting said heterocyclic compound into said polymer.

2. The polymer of claim 1 having at least one cross-linkable hydroxy group pendant from the polymer, wherein the polymer has a hydroxy equivalent weight of from about 500 to about 50,000.

3. The polymer of claim 1 wherein said heterocyclic group is derived from a compound selected from the group consisting of

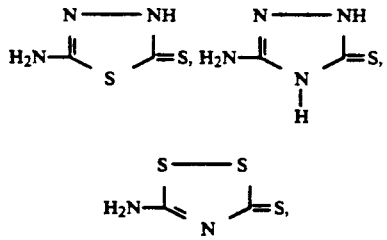

tautomers thereof, and mixtures thereof.

4. The polymer of claim 1 wherein said polymer has more than 2 hydroxy groups pendant from the polymer.

5. The polymer of claim 1 wherein said polymer has a linear structure.

6. The polymer of claim 1 wherein said polymer has a branched structure.

7. The polymer of claim 1 wherein the heterocyclic group equivalent weight of the polymer ranges from about 5000 to about 100,000.

8. The polymer of claim 2 wherein:

(a) the heterocyclic group equivalent weight of the polymer ranges from about 10,000 to about 30,000; and (b) the hydroxy equivalent weight of the polymer ranges from about 1,000 to about 5,000.

9. A dispersion for use in magnetic recording media comprising:
(a) the polymer of claim 1; and
(b) a magnetizable pigment dispersed in said polymer.

10. The dispersion of claim 9 which further comprises an additive selected from the group consisting of non-magnetizable pigments, lubricants, dispersants, wetting agents, and curatives.

11. The dispersion of claim 9 wherein said pigment is selected from the group consisting of ferric oxides; gamma ferric oxide; cobalt doped gamma ferric oxides, chromium oxide, iron, iron-cobalt, cobalt, nickel, cobalt-nickel, cobalt phosphorous, barium ferrite, and mixtures thereof.

12. The dispersion of claim 9 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

13. A dispersion for use in magnetic recording media comprising:
(a) the polymer of claim 2; and
(b) a magnetizable pigment dispersed in said polymer.

14. The dispersion of claim 13 which further comprises an additive selected from the group consisting of nonmagnetizable pigments, lubricants, dispersants, wetting agents, and curatives.

15. The dispersion of claim 13 wherein said pigment is selected from the group consisting of ferric oxides; gamma ferric oxide; cobalt doped gamma ferric oxides, chromium oxide, iron, iron-cobalt, cobalt, nickel, cobalt-nickel, cobalt phosphorous, barium ferrite, and mixtures thereof.

16. The dispersion of claim 13 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

17. A composite for magnetic recording comprising:
(a) a substrate having a front side and a back side;
(b) a dispersion coating on at least one side comprising the polymer of claim 1; and
(c) a magnetizable pigment and optionally a nonmagnetizable pigment dispersed in said dispersion on at least one side.

18. A composite for magnetic recording comprising:
(a) a substrate having a front side and a back side;
(b) a dispersion coating on at least one side comprising the polymer of claim 2; and
(c) a magnetizable pigment and optionally a nonmagnetizable pigment dispersed in said dispersion on at least one side.

19. A magnetic recording media having a magnetizable layer of fine particles which are dispersed in a binder wherein said binder comprises the polymer of claim 1.

20. A magnetic recording media having a magnetizable layer of fine particles which are dispersed in a binder wherein said binder comprises the polymer of claim 2.

21. The composite of claim 17 which further comprises an additive selected from the group consisting of non-magnetizable pigments, lubricants selected from the group consisting of fatty acids, fatty acid esters, and fluorochemical lubricants, dispersants, wetting agents, and curatives.

22. The composite of claim 18 which further comprises an additive selected from the group consisting of non-magnetizable pigments, lubricants selected from the group consisting of fatty acids, fatty acid esters, and fluorochemical lubricants, dispersants, wetting agents, and curatives.

* * * * *

UNITED STATES PATENT AND TRADEMARK OFFICE
CERTIFICATE OF CORRECTION

PATENT NO. : 5,081,213
DATED : January 14, 1992
INVENTOR(S) : James G. Carlson

It is certified that error appears in the above-identified patent and that said Letters Patent is hereby corrected as shown below:

Col. 2, line 12  "non-heterocyclicmercaptan" should read --non-heterocyclic mercaptan--

Col. 2, line 42  "$R^{1,2}=C_{118}$" should read --$R^{1,2}=C_{1-18}$--

Col. 4, line 24  "xanone, toluene, and mixtures thereof. Most cyclohe" should read --cyclohexanone, toluene, and mixtures thereof. Most--

Col. 4, line 46  "polymer This" should read --polymer. This--

Col. 11, line 64  "10.79" should read --10.7 g--

Col. 12, line 15  "MDI" should read --65.4 g MDI--

Col. 12, line 54  "4.6 g" should read --41.6 g--

Col. 13, line 16  "65.4 gg MEK" should read --278 g MEK--

Col. 16, line 30  "10 000 and 20 000" should read --10,000 and 20,000--

Signed and Sealed this

Twenty-eighth Day of September, 1993

Attest:

BRUCE LEHMAN

*Attesting Officer*   *Commissioner of Patents and Trademarks*